(12) United States Patent
Jayakumar et al.

(10) Patent No.: US 7,031,312 B1
(45) Date of Patent: Apr. 18, 2006

(54) METHOD AND SYSTEM FOR ASSIGNING MULTIPROTOCOL LABEL SWITCHING (MPLS) VC (VC) LABELS WHEN TRANSPORTING ASYNCHRONOUS TRANSFER MODE (ATM) DATA OVER MPLS NETWORK

(75) Inventors: Jayakumar Jayakumar, San Jose, CA (US); Hariprasad Ginjpalli, Cupertino, CA (US); Durai Chinnaiah, San Jose, CA (US); Anil Joshi, Sunnyvale, CA (US); Sobha Kumar Kondaveeti, San Jose, CA (US)

(73) Assignee: Cicso Technology, Inc., San Jose, CA (US)

( * ) Notice: Subject to any disclaimer, the term of this patent is extended or adjusted under 35 U.S.C. 154(b) by 903 days.

(21) Appl. No.: 09/975,246

(22) Filed: Oct. 10, 2001

(51) Int. Cl.
*H04L 12/56* (2006.01)

(52) U.S. Cl. .................................. 370/392; 370/395.3

(58) Field of Classification Search ................ 370/392, 370/395.3
See application file for complete search history.

(56) References Cited

U.S. PATENT DOCUMENTS

2004/0004955 A1* 1/2004 Lewis ........................ 370/351

OTHER PUBLICATIONS

Chuck Semeria, "Multiprotocol Label Switching: Enhancing Routing in the New Public Network," www.juniper.net, Jul. 27, 2001, Juniper Networks, Inc., pp. 1-19.
E. Rosen, et al., "Multiprotocol Label Switching Architecture," Internet Engineering Task Force, Jan. 2001, The Internet Society, pp. 1-54.
Luca Martini, et al., "Transport of Layer 2 Frames Over MPLS," Internet Engineering Task Force, Jul. 2001, pp. 1-14.
Luca Martini, et al., "Encapsulation Methods for Transport of Layer 2 Frames Over IP and MPLS Networks," Internet Engineering Task Force, Jul. 2001, pp. 1-15.
L. Andersson, et al., "LDP Specification," Internet Engineering Task Force, Jan. 2001, The Internet Society, pp. 1-116.
Goran Hagard and Mikael Wolf, "Multiprotocol Label Switching in ATM Networks," The Telecommunications Technology Journal—No. 1, 1998, pp. 1-15.
Luca Martini, et al., "Transport of Layer 2 Frames Over MPLS draft-martini-12circuit-trans-mpls-07.txt," www.community.roxen.com, Jul. 2001, pp. 1-10.
"Layer 3 Switching Using MPSL," 1999-2000, NetPlane Systems, Inc., Dedham, MA, USA, pp. 1-20.

* cited by examiner

*Primary Examiner*—Melvin Marcelo
(74) *Attorney, Agent, or Firm*—Blakely, Sokoloff, Taylor & Zafman LLP

(57) ABSTRACT

A first and a second switching node establish a tunnel to transport a packet through a multiprotocol label-switching (MPLS) network. The tunnel is associated with a unique tunnel key. One or more virtual ciruit (VC) labels are automatically generated using the tunnel key.

20 Claims, 7 Drawing Sheets

METHOD AND SYSTEM FOR ASSIGNING MULTIPROTOCOL LABEL SWITCHING (MPLS) VC (VC) LABELS WHEN TRANSPORTING ASYNCHRONOUS TRANSFER MODE (ATM) DATA OVER MPLS NETWORK

FIELD OF INVENTION

The present invention relates generally to computer networks. More specifically, the present invention relates to routing and switching of data cells and packets through a Multiprotocol Label Switching ("MPLS") network.

BACKGROUND OF THE INVENTION

Multiprotocol label switching is a standardized multi-layer switching technology that integrates Internet Protocol ("IP") Layer 3 routing services with Layer 2 data forwarding based on label swapping. That is, MPLS uses labels to route packets through a network instead of using IP addresses. MPLS networks are gaining in popularity and strategic importance for enterprise and public network infrastructures, in part, because MPLS simplifies and improves data exchange while maintaining operability with legacy network technologies. In particular, MPLS works with various types of Layer 2 protocol data units ("PDUs").

ATM is a technology for transmitting data that is broken down into equal sized data units called "cells." Like MPLS, ATM is a connection-oriented technology based on VCs. Thus, MPLS can be used to communicate ATM cells using VCs based on a label in headers of ATM cells. ATM cells, however, must first be encapsulated into packets for transport through a MPLS network. This allows ATM networks to be bridged by an MPLS network to transport ATM cells between ATM networks.

To bridge two ATM networks together with an MPLS network, the MPLS network typically includes an ingress label switching router ("LSR") and an egress LSR. The ingress LSR receives ATM cells from an ATM network and encapsulates the cells to form MPLS packets for transport over the MPLS network. The egress LSR receives the MPLS packets and reverses the result of the original encapsulation before forwarding the resulting ATM cells to another ATM network. This type of encapsulation process, which enables one network to send its data over another network connection, is referred to as a "tunnel". To encapsulate an ATM cell for transport over an MPLS tunnel, a tunnel label and VC label are required. The tunnel label contains information used by LSRs to forward the MPLS packet through the tunnel. The VC label is used to distinguish emulated VCs, or label switched paths, within a single tunnel and to distinguish the different ATM VCs available at the egress LSR.

Before the ingress LSR can encapsulate an ATM cell to form an MPLS packet, the ingress LSR and the egress LSR must agree on the meaning of each label. For example, the ingress LSR must populate its routing table with label and route information for routing an incoming ATM cell across the MPLS network to the egress LSR. Furthermore, the ingress LSR must populate its routing table with the available routes, and the labels corresponding to those routes, on which the egress LSR can forward ATM cells. In prior schemes, this is generally accomplished by having the ingress and egress LSRs exchange and maintain route and label information by negotiating via a series of communication sessions, using a label distribution protocol ("LDP"). Such an exchange is explained in detail with reference to FIG. 1.

FIG. 1 illustrates a diagram of a prior art MPLS network environment bridging ATM networks with an ingress and egress LSRs that negotiate VC labels over a LDP session. Referring to FIG. 1, MPLS network environment 100 includes an ATM network 105 and ATM network 110 bridged by an MPLS network 101. An interface point, or switching node, between ATM network 105 and MPLS network 101 is represented by ingress LSR 115. Similarly, egress LSR 120 serves as an interface point between ATM network 110 and MPLS network 101. Ingress LSR 115 communicates with egress LSR 120 via tunnel 125.

To establish tunnel 125, a network administrator will manually configure ingress LSR 115 and egress LSR 120 to be used by Private Network to Network Interface ("PNNI") protocols to communicate with ATM networks 105 and 110, respectively. Next, the network administrator will use a network management system (not shown) to identify the ingress and egress LSRs, 115 and 120. Ingress LSR 115 and egress LSR 120 initiate LDP sessions 130 through which they use standard IP protocols and peer discovery routines to determine one or more VCs through tunnel 125. Once the VCs have been determined, egress LSR 120 will initiate a series of LDP sessions 130 to negotiate common tunnel labels and VC labels for the label switched paths (LSP) through the tunnel 125, and to inform ingress LSR 115 about the labels associated with the paths to ATM nodes 140, 145, 150 and 155. The tunnel 125 is associated with a tunnel identification key or tunnel key. The tunnel key is a number that ranges, for example, from 0 to 4,294,96,295. The tunnel key must be the same at both ends of the tunnel.

One problem with such a prior art scheme is that it is not scalable. For example, in an extremely large MPLS WAN, there may be several LSR nodes between the ingress and egress LSRs as well as several ATM nodes connected at either edge. Thus, in order to negotiate VC labels, each node requires a separate label distribution session thereby placing a heavy processing burden on an LSR with multiple connections. Furthermore, the control and signaling sessions are in-band thereby lowering the bandwidth available for data transmissions.

Another problem with such a prior art scheme is that PNNI is incompatible with LDP, which is the protocol that performs the same functions in an MPLS network as PNNI. Consequently, a network administrator must perform time consuming and tedious tasks of manually configuring routing tables on one or more of the switching network nodes so that the ATM and MPLS networks work seamlessly. Furthermore, ATM nodes and the MPLS nodes tend to be manufactured from different vendors and have different network management systems creating further challenges.

SUMMARY OF THE INVENTION

A method of transporting data packets through a multiprotocol label-switching (MPLS) network is disclosed. For one embodiment, a first and second switching node establishes a tunnel to transport a packet through the MPLS network. The tunnel is associated with a unique tunnel key. One or more virtual ciruit (VC) labels are automatically generated using the tunnel key.

Other features and advantages of the present invention will be apparent from the drawings and detailed description that follow.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A method and a system for assigning MPLS VC labels when transporting ATM data over MPLS networks are disclosed. A first and second switching nodes establish a tunnel to transport a packet through an MPLS network. A tunnel key is used to uniquely identify the tunnel. One or more VC labels are automatically generated based on the tunnel key. Each VC label is used to identify a path on which the second switching node is to forward a packet received via the tunnel. The packet transported through the MPLS network includes ATM cells.

By automatically generating VC labels, switching nodes avoid a negotiating process to determine the VC labels. This improves transport efficiency of packets through an MPLS network by decreasing the processing burden and the amount of in-band signaling associated with establishing and maintaining label negotiation sessions. Furthermore, automatically generating VC labels improves the scalability of MPLS networks because the processing burden on LSRs in large networks is significantly reduced. In addition, network setup time is reduced and network maintenance is simplified because the VC label maintenance can be tied to tunnel label maintenance sessions.

Figure 1:
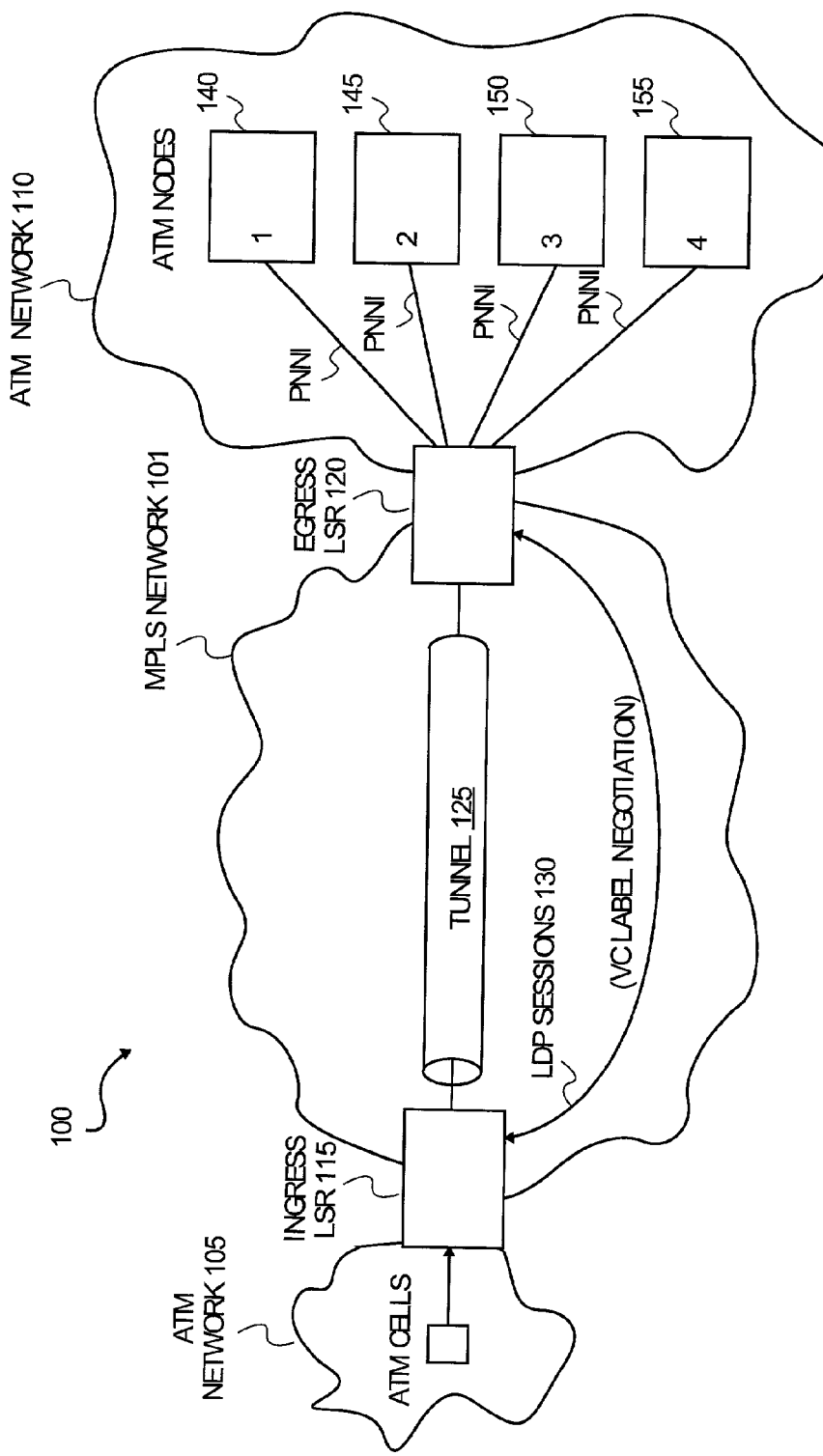
FIG. 1 illustrates a diagram of a prior art MPLS network environment bridging ATM networks with an ingress and egress LSRs that negotiate VC labels over a LDP session.
Figure 2:
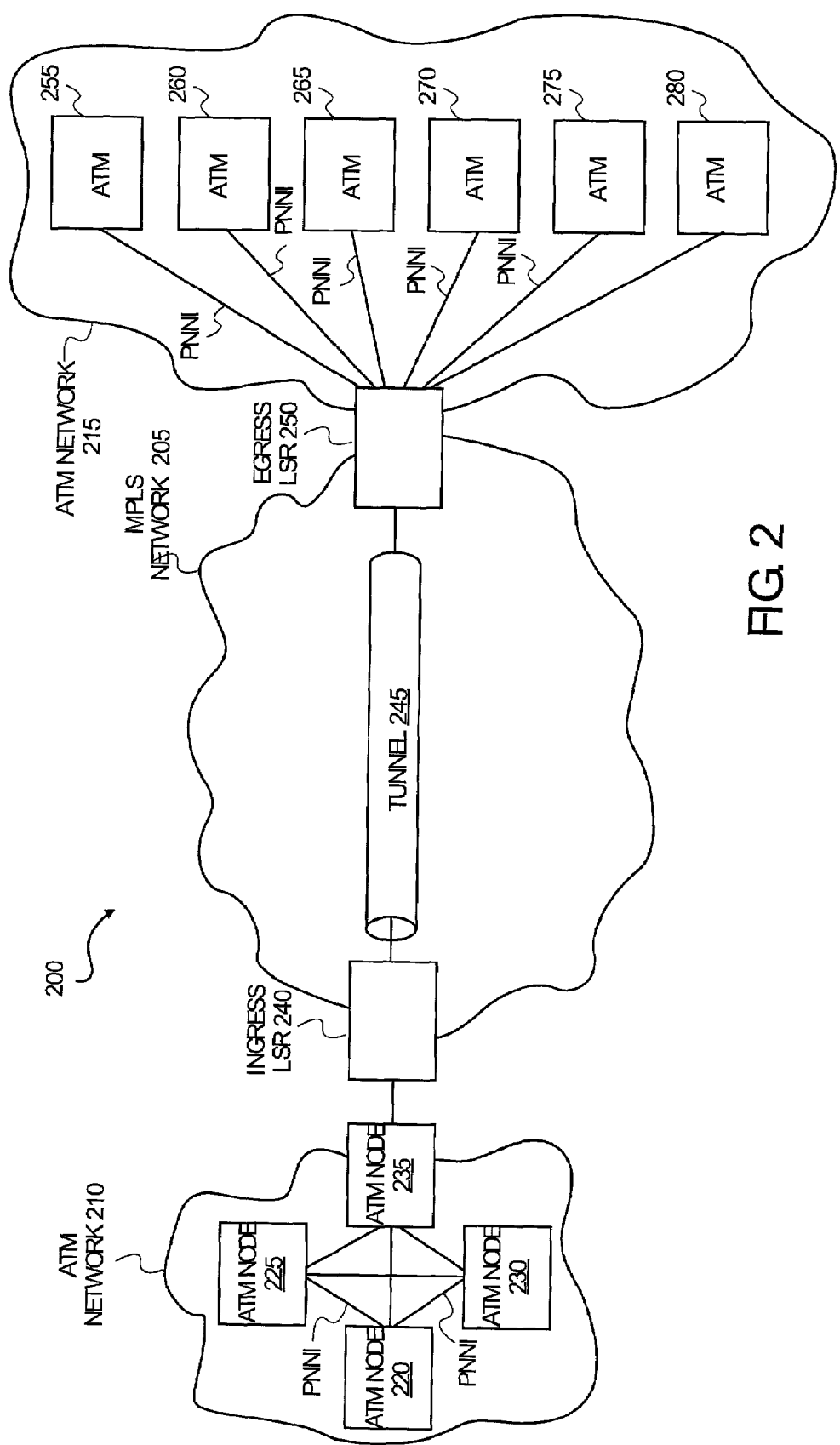
FIG. 2 illustrates a diagram of a MPLS network environment bridging ATM networks without requiring an ingress and an egress LSR to negotiate VC labels according to one embodiment.

FIG. 2 illustrates a diagram of a MPLS network environment bridging ATM networks without requiring an ingress and an egress LSR to negotiate VC labels according to one embodiment. Referring to FIG. 2, MPLS network environment 200 includes ATM network 210 and ATM network 215 bridged together by MPLS network 205. ATM network 210 may include a plurality of ATM nodes 220 through 235. ATM network 215 may also include a plurality of ATM nodes 255 through 280. Each of the ATM nodes 220 through 235 of ATM network 210 can be a switching node. Similarly, each of the ATM nodes 255 through 280 of ATM network 215 can be a switching node. A switching node may be embodied as a network device such as a network router, gateway, hub, bridge, or other like network devices.

Any of the ATM nodes 220 through 235 of ATM network 210 can communicate with any of the ATM nodes 255 through 280 of ATM network 215 by sending ATM cells across MPLS network 205 via tunnel 245. Tunnel 245 has as its endpoints ingress LSR 240 and egress LSR 250. Ingress LSR 240 and egress LSR 250 are edge LSRs of MPLS network 205. Ingress LSR 240 receives ATM cells from ATM network 210 and encapsulates the ATM cells for transport through tunnel 245. Encapsulation, as will be described in further detail below, involves prepending a tunnel label and a VC label onto an ATM PDU ("protocol data unit"). After encapsulating an ATM cell to form an MPLS packet, ingress LSR 240 forwards the MPLS packet through tunnel 245 to egress LSR 250. Egress LSR 250 reverses the result of the encapsulation by removing any labels added by ingress LSR 240 and forwards the resulting ATM cell to one of ATM nodes 255 through 280 based on the VC label.

Figure 3:
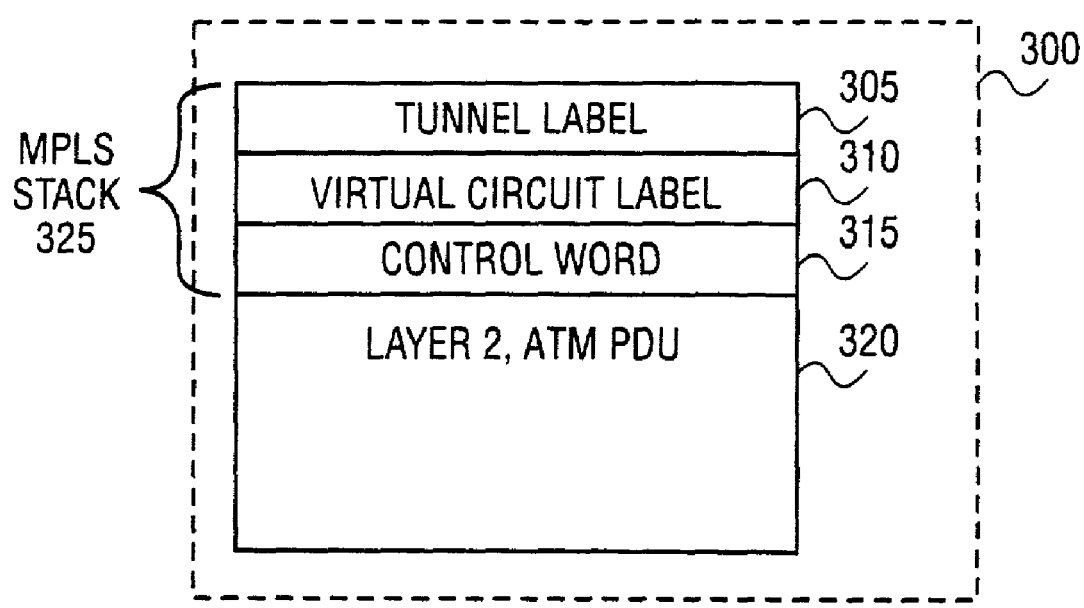
FIG. 3 illustrates a diagram of a Layer 2 ATM PDU that has been encapsulated into an MPLS packet.

FIG. 3 illustrates a block diagram of a Layer 2 ATM PDU 320 that has been encapsulated into MPLS packet 300. MPLS packet 300 includes Layer 2 ATM PDU 320 with an MPLS stack layer 325 including control word 315, VC label 310, and tunnel label 305. Control word 315 contains information related to Layer 2 PDU 320, which is necessary to properly emulate the corresponding Layer 2 protocol. Depending on the Layer 2 PDU being implemented, control word 315 may be optional. VC label 310 distinguishes the different emulated VCs through tunnel 245. For example, when there are multiple VCs or label switched paths (LSPs) from ingress LSR 240 to egress LSR 250 (as illustrated in FIG. 2), the tunnel label 305 determines the actual path that MPLS packet 300 will travel through tunnel 245. VC label 310 also determines the path on which the ATM cell is forwarded at egress LSR 250. Tunnel label 305 contains information needed to transport MPLS packet 300 across MPLS network 205. The embodiments described herein are independent of the particular type of Layer 2 ATM PDU used and may be implemented a variety of ATM adaptation layers. For example, the following embodiment may be implemented with ATM adaptation layers such as AALx and AAL5e.

Before an ingress LSR can prepend a tunnel label or VC label to an ATM PDU, the ingress LSR and the egress LSR that form the endpoints of a tunnel must agree on the meaning of each label. For example, referring to FIG. 2, ingress LSR 240 may need to populate its routing table with label mapping information for routing an incoming ATM cell across MPLS network 205 to egress LSR 250. Furthermore, ingress LSR 240 may need to populate its routing table with label mapping information for the available routes on which egress LSR 250 can forward ATM cells. Egress LSR 250 can forward ATM cells to any one of ATM nodes 255 through 280. As will be described in further detail below, ingress LSR 240 and egress LSR 250 do not require negotiating a VC label that is automatically generated based on the value of a tunnel key. This eliminates the use of LDP sessions to negotiate VC labels.

Figure 4:
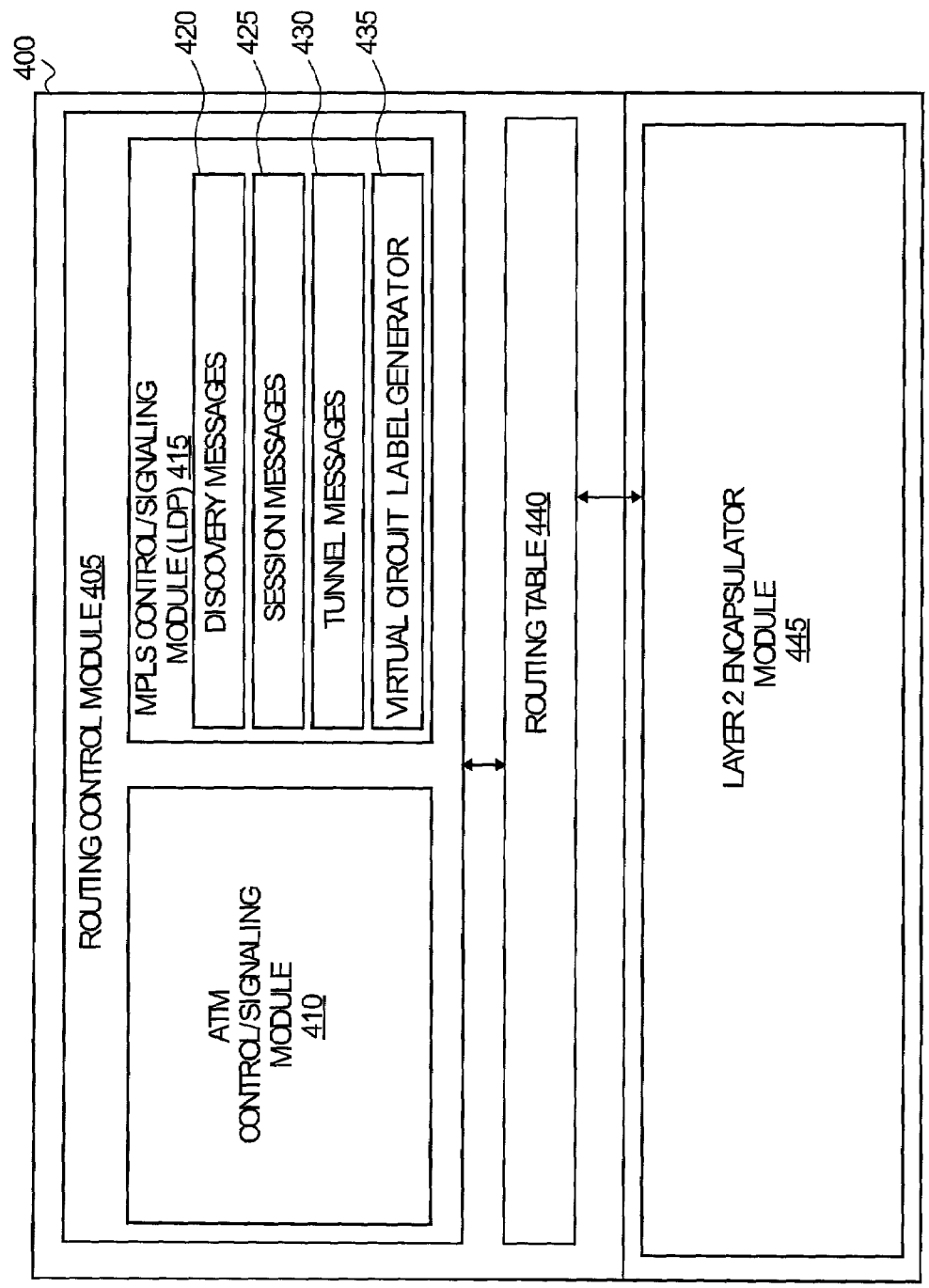
FIG. 4 illustrates a functional block diagram of an MPLS edge LSR, according to one embodiment.

FIG. 4 illustrates a functional block diagram of an MPLS edge LSR according to one embodiment. Edge LSR 400 can be an ingress LSR or an egress LSR depending on its orientation in relation to the flow of packets. In the example of FIG. 4, edge LSR 400 may represent internal components and modules for ingress LSR 240 or egress LSR 250. Edge LSR 400 includes a routing control module 405, a routing table 440, and a Layer 2 encapsulator module 445. For one embodiment, routing control module 405 is implemented in software and Layer 2 encapsulator module 445 is implemented in hardware. However, in alternative embodiments, such modules may be implemented using a combination of hardware and software to perform the operations described herein. Layer 2 encapsulator module 445 controls packet-forwarding services for edge LSR 400.

Referring to FIG. 4, routing control module 405 includes ATM control/signaling module 410 and MPLS control/signaling module 415. Routing control module 405 establishes network routes and manages routing services by maintaining and updating routing table 440 with label mapping information. ATM control/signaling module 410 controls the routing services for the ATM portion of the network by sending and receiving standard ATM protocol messages. For example, ATM control/signaling module 410 of ingress LSR 240 illustrated in FIG. 2 uses PNNI protocol messages to communicate with peer ATM nodes 220 through 235.

MPLS control/signaling module 415 includes LDP sessions 420 through 430 and VC label assignment module 435. MPLS control/signaling module 415 controls the routing services for the MPLS portion of the network by sending and receiving LDP messages. There is an LDP session for each VC label. The LDP session carries discovery messages 420, session messages 425, tunnel messages 430, etc. The LDP session uses the session messages 425 to establish and maintain LDP communication sessions with peer MPLS network nodes. The LDP session uses the discovery messages 420 to announce and maintain its presence in the network and to discover the network topology. The LDP session uses the tunnel messages 430 to create, change, and delete label mappings and tunnel information for LSPs across the MPLS network.

For one embodiment, a network administrator can initiate the formation of a tunnel using edge LSR 400 as one endpoint by identifying endpoints. Once the network administrator has identified the endpoints of the tunnel, routing control module 405 of edge LSR 400 sends and receives session messages 425 and discovery messages 420 via the LDP session to establish paths through the tunnel to a second edge LSR. Once the paths are known, edge LSR 400 uses the LDP session to distribute the tunnel messages 430 which includes label mapping information for the label switched paths through the MPLS network. Edge LSR 400 also uses the LDP session to negotiate a unique tunnel key with the second edge LSR. The unique tunnel key is used by both edge LSRs to bind a bi-directional tunnel through the MPLS network. Once the bi-directional tunnel has been established, VC label generator 435 uses the unique tunnel key to automatically generate VC labels that correspond to paths available at the egress LSR.

Such an automatic generation of VC labels provides a number of advantages. For instance, because the VC labels are automatically generated based on the tunnel key, the maintenance of the VC labels can be tied to tunnel labels. That is, when the tunnel label is withdrawn, the VC labels can be removed as well. This simplifies network setup and maintenance.

For one embodiment, VC label generator 435 assigns VC labels to paths according to the different quality of service levels ("QoS levels") supported by the different ATM adaptation layers such as, for example, AALx and AAL5 adaptation layers. For example, VC label generator 435 automatically generates VC labels by shifting the bits of the tunnel key to create a VC label for each QoS level supported by the AALx and AAL5 ATM adaptation layers. For one embodiment, the following formula is used to automatically generate the VC labels for each QoS level:

$$VC\ label = (Key <<4) + n,$$

where $0 \leq n \leq 15$, and where (Key <<4) means shifting the key four bits to the left.

The following Table 1 illustrates one example of generating VC labels using a unique tunnel key. The Table 1 illustrates bit-shifting examples using the above formula to generate VC labels for each QoS level associated with the AALx and AAL5e ATM adaptation layers. In this table, the QoS levels include Constant Bit Rate (CBR), Variable Bit Rate (VBR), Unspecified Bit Rate (UBR), Guaranteed Frame Rate (GFR), and Available Bit Rate (ABR).

TABLE 1

| ATM Adaptation Layer | QoS | Bit-shifting function |
| --- | --- | --- |
| AALx | CBR | Key << 4 |
| AALx | rtVBR | (Key << 4) + 1 |
| AALx | nrtVBR | (Key << 4) + 2 |
| AALx | ABR | (Key << 4) + 3 |
| AALx | UBR | (Key << 4) + 4 |
| AALx | GFR | (Key << 4) + 5 |
| AALx | Reserved | (Key << 4) + 6 |
| AALx | Reserved | (Key << 4) + 7 |
| AAL5e | CBR | (Key << 4) + 8 |
| AAL5e | rtVBR | (Key << 4) + 9 |
| AAL5e | nrtVBR | (Key << 4) + 10 |
| AAL5e | ABR | (Key << 4) + 11 |
| AAL5e | UBR | (Key << 4) + 12 |
| AAL5e | GFR | (Key << 4) + 13 |
| AAL5e | Reserved | (Key << 4) + 14 |
| AAL5e | Reserved | (Key << 4) + 15 |

The VC label generator 435 accepts as input the tunnel key that uniquely identifies the two uni-directional tunnels between an ingress LSR and an egress LSR. Using the example provided in the above Table 1, the VC label generator 435 first bit-shifts the tunnel key four places in accordance with the table above. VC label generator 435 then assigns the resulting value to the VC label for the ATM QoS level CBR (Common Bit Rate). Next, VC label generator 420 increments the result from the previous bit-shifts by a value of n=1 (where $0 \leq n \leq 15$) and assigns the resulting value as the VC label for the ATM QoS level defined as rtVBR (real time-Variable Bit Rate). This automatic generation of the VC labels continues using a next incremental value of "n".

Each time the VC label generator 435 assigns a VC label, the label is updated in routing table 440. For one embodiment, VC label generator 435 will continue to bit-shift the tunnel key and assign label values in accordance with above table until all QoS levels for ATM adaptation layers AALx or AAL5e have been assigned a VC label.

Layer 2 encapsulator module 445 also receives and forwards data packets or cells. When edge LSR 400 is functioning as an ingress LSR, Layer 2 encapsulator module 445 pushes tunnel labels and VC labels onto incoming Layer 2 ATM PDUs. When edge LSR 400 is functioning as an egress LSR, Layer 2 encapsulator module 445 pops tunnel labels and VC labels from Layer 2 ATM PDUs from incoming MPLS packets and adds ATM headers to create ATM cells.

Figure 5:
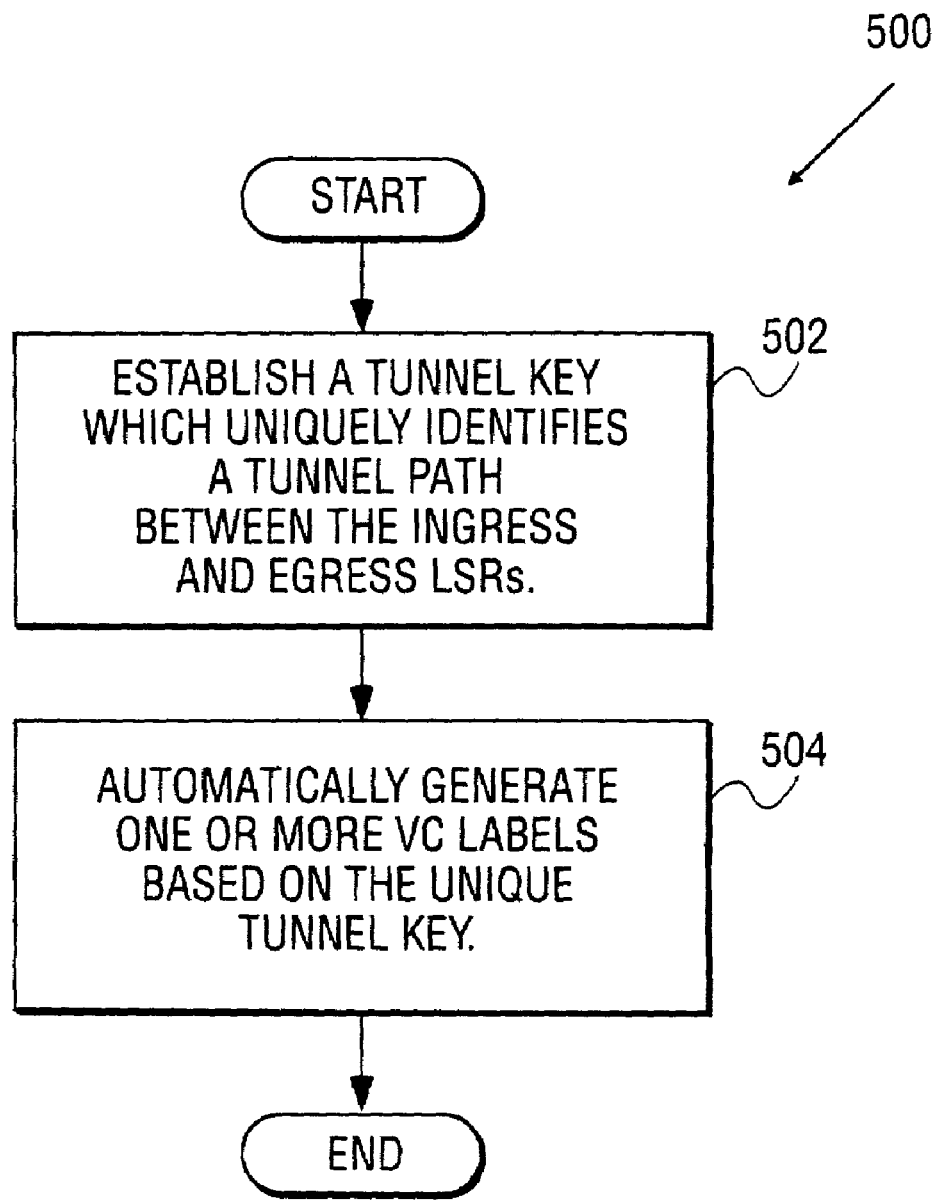
FIG. 5 illustrates a flow diagram of a process to establish communication between an ingress LSR and an egress LSR according to one embodiment.

FIG. 5 illustrates a flow diagram of a process to establish communication between an ingress LSR and an egress LSR according to one embodiment. The process 500 starts at block 502.

At block 502, two edge LSRs establish a tunnel such that an encapsulated ATM PDU can be transported from an ingress LSR (e.g., ingress LSR 240) to an egress LSR (e.g., egress LSR 250) based on the tunnel label that is originally pushed onto the MPLS stack of the ATM PDU at the ingress LSR. The tunnel is known to both LSRs by a unique tunnel key.

At block 504, both the ingress and egress LSRs may automatically generate VC labels based on the unique tunnel key such that each ATM QoS level acquires a label mapping which is known to both the ingress and egress LSRs. This can be accomplished without the ingress and egress LSRs having to negotiate VC labels over an LDP session.

Figure 6:
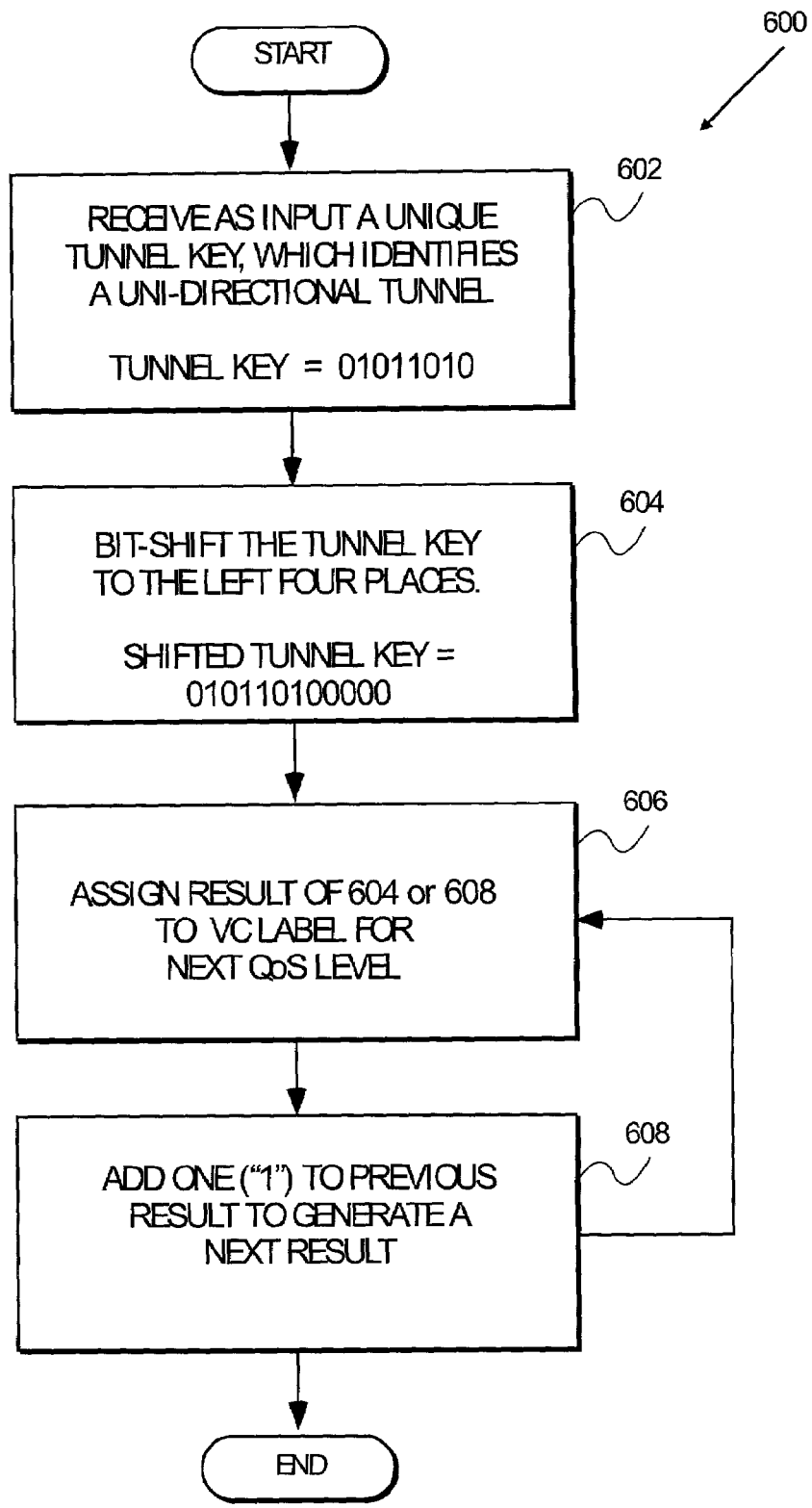
FIG. 6 illustrates a detailed flow diagram of a process to automatically generate VC labels based on a unique tunnel key of FIG. 5 according to one embodiment.

FIG. 6 illustrates a detailed flow diagram of a process to automatically generate VC labels based on a unique tunnel key of FIG. 5 according to one embodiment. The process 600 provides a detailed illustration of the operation performed in block 504 of FIG. 5. The process 600 may be implemented to support all existing QoS levels, as well as two future levels, for ATM adaptation layers AALx and AAL5e. Those QoS levels are described in Table 2 shown below.

TABLE 2

| | |
|---|---|
| CBR | Constant Bit Rate |
| rtVBR | real time Variable Bit Rate |
| nrtVBR | non real time Variable Bit Rate |
| ABR | Available Bit Rate |
| UBR | Unspecified Bit Rate |
| GFR | Guaranteed Frame Rate |
| Reserved | Reserved for future QoS level |
| Reserved | Reserved for future QoS level |

The process 600 begins at block 602 where VC label generator 435 receives a unique tunnel key that identifies a bi-directional tunnel. The operation performed in block 602 uses a sample tunnel key value for purposes of explanation. The sample tunnel key has a value of "1010101".

At block 604, VC label generator 435 performs a bit-shifting function on the tunnel key. This shift the bits of the tunnel key to the left four places. The resulting sample tunnel key value after the shift is "010110100000".

At block 606, VC label generator 435 assigns the resulting value from block 604 to a VC label for the first QoS level. Referring to the Table 2 above, the VC label for the CBR QoS level is "010110100000".

At block 608, the VC label generator 435 adds one ("1") to resulting value from block 604 to generate a next VC label. From this addition operation, a next resulting value is "010110100001".

From block 608, the process 600 is then repeated at block 606 until label values have been assigned to each QoS level identified in the Table 2 above.

Figure 7:
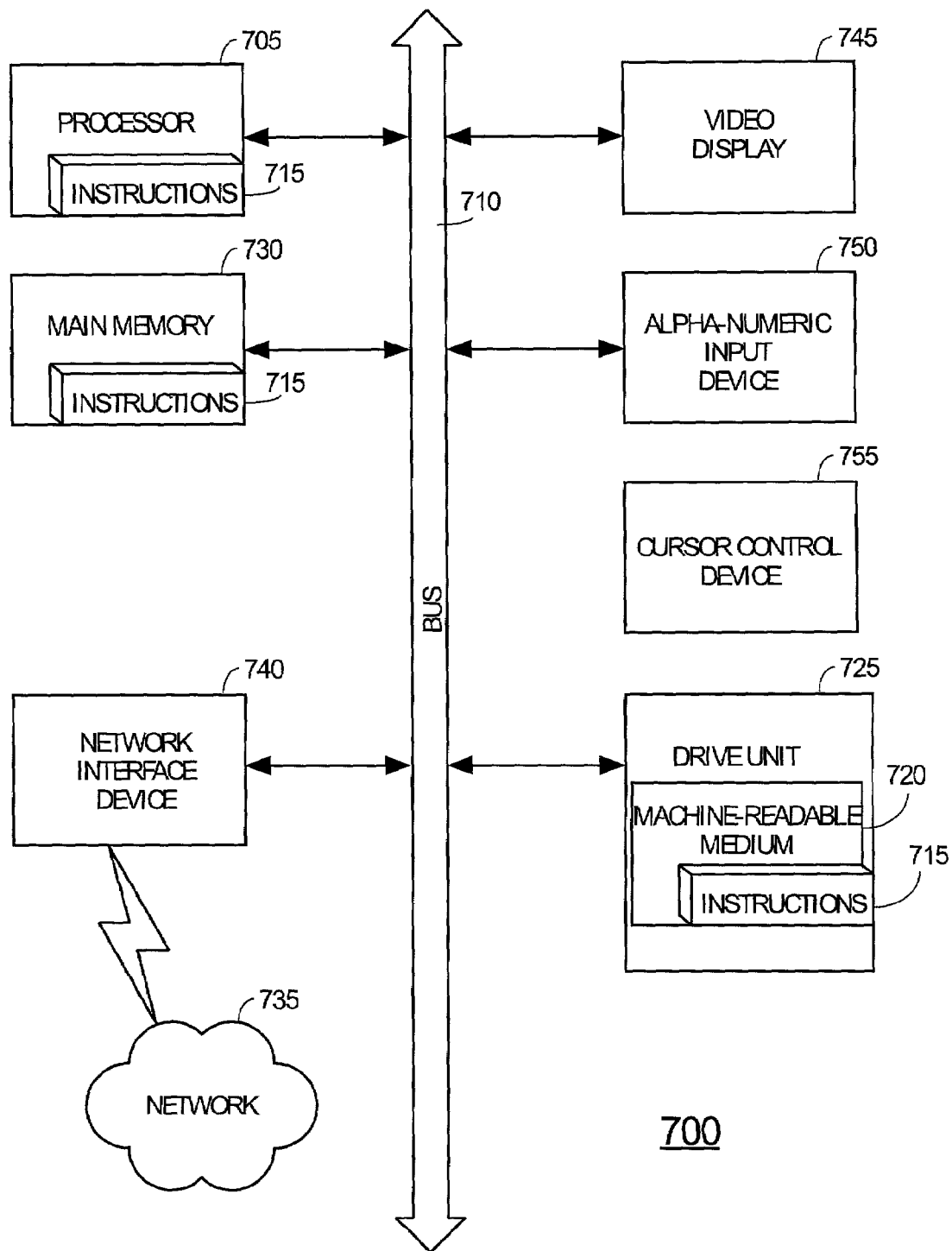
FIG. 7 illustrates a computer system that can be used with one embodiment of the present invention.

FIG. 7 illustrates a computer system that can be used with one embodiment of the present invention. The operations of the various methods of the present invention may be implemented by a processing unit 705 in a digital processing system 700. The processing unit 705 is coupled with a bus 710 and executes sequences of computer program instructions 715. For example, the computer program instructions 715 may include instructions to perform the shifting of the unique tunnel key, and the assignment of the resulting shifted value to the VC label. The computer program instructions 715 may also include instructions to add one ("1") to the above resulting shifted value to generate a next VC label in accordance with the process described in FIG. 6.

The instructions 715 may be stored in a memory which may be considered to be a machine-readable storage media 720. The machine-readable storage media 720 may be used with a drive unit 725 coupled with the bus 710. The instructions 715 may be loaded into main memory 730 coupled with the bus 710. Although not shown, other memory devices such as, for example, read-only memory, a persistent storage memory, or any combination of these devices may also be used to store the instructions 715.

Execution of the sequences of instruction 715 causes the processing unit 705 to perform operations according to the present invention. The instructions 715 may be loaded into the main memory 730 from a storage device or from one or more other digital processing systems (e.g. a server computer system) over a network 735 using network interface device 740. In other cases, the instructions 715 may not be performed directly or they may not be directly executable by the processing unit 705. Under these circumstances, the executions may be executed by causing the processing unit 705 to execute an interpreter that interprets the instructions 715, or by causing the processing unit 705 to execute instructions, which convert the received instructions 715 to instructions which can be directly executed by the processor. Other devices may also be connected to the bus 710 including, for example, a video display 745, an alphanumeric input device 750, and a cursor control device 755.

In other embodiments, hard-wired circuitry may be used in place of or in combination with software instructions to implement the present invention. Thus, the present invention is not limited to any specific combination of hardware circuitry and software, nor to any particular source for the instructions executed by the digital processing system 700.

Thus, a method and system for transporting ATM cells over an MPLS network have been described. In the foregoing detailed description, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. In a Multiprotocol Label Switching (MPLS) network environment having a first switching node and a second switching node, a method comprising:
    establishing a tunnel key to identify a tunnel path the tunnel path used to transport a packet from the first switching node and the second switching node; and
    automatically generating one or more virtual circuit (VC) labels based on the tunnel key.

2. The method of claim 1, wherein the automatically generating of the one or more VC labels includes automatically generating one or more VC labels based on the tunnel key without a negotiation session between the first and second switching nodes.

3. The method of claim 1, wherein the automatically generating of the one or more VC labels includes generating a VC label for each quality of service (QoS) level supported by an ATM network.

4. The method of claim 1, wherein the automatically generating of the one or more VC labels includes generating a VC label for each quality of service (QoS) level supported by an ATM adaptation layer.

5. The method of claim 1, wherein the automatically generating of the one or more VC labels includes generating each VC label by bit shifting of the tunnel key.

6. A switching node for a Multiprotocol Label Switching (MPLS) network, comprising:
    a routing control module to establish a tunnel key, the tunnel key to identify a tunnel path from the switching node to a second switching node; and, a VC generator module to automatically generate one or more VC labels based on the tunnel key.

7. The switching node of claim 6, wherein the VC label generator module is to automatically generate the one or more VC labels without negotiating with another switching node.

8. The switching node of claim 6, wherein the VC label generator module is to automatically generate a VC label for every quality of service (QoS) level supported by an ATM network.

9. The switching node of claim 6, wherein the VC label generator module is to automatically generates a VC label for every quality of service (QoS) level supported by an ATM adaptation layer.

10. The switching node of claim 6, wherein the VC label generator module is to automatically generate one or more VC labels by bit shifting of the tunnel key.

11. A computer-readable medium, having stored thereon sequences of instructions which are executable by a processor, and which, when executed by the processor, cause the processor to:
    establish a tunnel key identifying a tunnel path, the tunnel path used to transport a packet between a first switching node and a second switching node; and
    automatically generate one or more VC labels based on the tunnel key.

12. The computer readable medium of claim 11, wherein the sequences of instructions, when executed by the processor, do not cause the processor to establish a negotiation session with a second processor.

13. The computer readable medium of claim 11, wherein the sequences of instructions, when executed by the processor, cause the processor to automatically generate one or more VC labels based on the tunnel key, and to generate a VC label for each quality of service (QoS) level supported by an ATM network.

14. The computer readable medium of claim 11, wherein the sequences of instructions, when executed by the processor, cause the processor to automatically generate one or more VC labels based on the tunnel key, and to generate a VC label for each quality of service (QoS) level supported by an ATM adaptation layer.

15. The computer readable medium of claim 11, wherein the sequences of instructions, when executed by the processor, causes the processor to automatically generate one or more VC labels based on the tunnel key, and to generate each VC label by bit shifting the tunnel key a predetermined number of times.

16. A switching node, comprising:
    a routing control means for establishing a tunnel key, the tunnel key to identify a tunnel path from the switching node to a second switching node; and,
    a virtual circuit (VC) label generator means for generating one or more VC labels based on the tunnel key.

17. The switching node of claim 16, wherein the VC label generator means generates the one or more VC labels without negotiating with another switching node.

18. The switching node of claim 16, wherein the VC label generator means generates a VC label for every quality of service (QoS) level supported by an ATM network.

19. The switching node of claim 16, wherein the VC label generator means generates a VC label for every quality of service (QoS) level supported by an ATM adaptation layer.

20. The switching node of claim 16, wherein the VC label generator means generates one or more VC labels by bit shifting of the tunnel key.

* * * * *